United States Patent [19]

Siegler et al.

[11] 4,115,018

[45] Sep. 19, 1978

[54] SLEEVE PLUG FOR ATTACHMENT TO A SPINDLE HEAD

[76] Inventors: Gustav Siegler, Kirchheimer Strasse 34, D 7317 Wendlingen; Eberhard Jahn, Schlosserweg 10, D 7300 Esslingen-Wiflingshausen, both of Fed. Rep. of Germany

[21] Appl. No.: 837,447

[22] Filed: Sep. 28, 1977

[30] Foreign Application Priority Data

Oct. 15, 1976 [DE] Fed. Rep. of Germany ... 7632247[U]

[51] Int. Cl.² .................. B23B 31/10; B23B 5/22
[52] U.S. Cl. ................. 408/239 A; 279/1 B; 279/75
[58] Field of Search ............ 408/39, 39 A; 279/1 B, 279/75

[56] References Cited

U.S. PATENT DOCUMENTS

| 3,552,758 | 1/1971 | Siegler | 279/75 |
| 3,633,931 | 1/1972 | Bilz | 279/75 |
| 3,756,737 | 9/1973 | Smith | 408/239 |
| 3,790,182 | 2/1974 | Schuman | 279/1 B |
| 3,887,203 | 6/1975 | Benjamin et al. | 279/1 B |

*Primary Examiner*—Harrison L. Hinson
*Attorney, Agent, or Firm*—Roylance, Abrams, Berdo & Farley

[57] ABSTRACT

A quickly attachable and releasable assembly for attachment to a spindle head includes a plug casing insertable into the spindle head, a stop nut thereon, and two bushings loosely connected to the nut. One bushing carries a plurality of locking balls and the other bushing has a cam surface to urge the balls inwardly to engage the head. A spring urges the bushings apart to cause the cam surface to so operate.

6 Claims, 1 Drawing Figure

U.S. Patent  Sept. 19, 1978  4,115,018
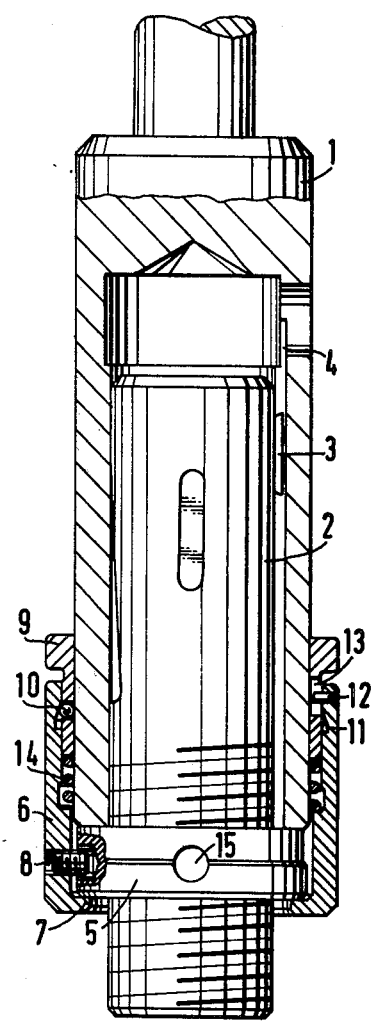

SLEEVE PLUG FOR ATTACHMENT TO A SPINDLE HEAD

This invention relates to a sleeve-plug assembly for attachment to a spindle head in a machine tool.

BACKGROUND OF THE INVENTION

It is known to provide a sleeve plug assembly to be attached to a spindle head on a metal working machine, the plug portion of the assembly being adapted to receive a tool. A known device of this general type includes a locking bushing attached to a plug, and a holding screw which must be screwed radially into the spindle head, the head of the screw also penetrating the locking bushing. As will be evident, if a suitable internally threaded hole of the proper size is not already present in the spindle head at the proper location, it would be necessary to provide one. Also, it will be seen that sufficient space laterally of the spindle head must be present to permit attachment of the holding screw into the spindle head and locking bushing.

BRIEF DESCRIPTION OF THE INVENTION

An object of the present invention is to provide a sleeve plug assembly which can be attached to a spindle head without the need for an attachment screw.

A further object is to provide a sleeve plug assembly which can be firmly attached to a spindle head whether or not the head is provided with a threaded hole to receive an attachment screw, the assembly being removable only by the exertion of forces not normally encountered in operation of the machine. Briefly described, the invention includes a sleeve-plug assembly attachable to a spindle head of the type having a generally cylindrical body and a bore extending axially into one end thereof, the assembly including the combination of an adjusting nut, an adjustable adapter insertable into the bore of the spindle head, the adapter having a threaded end protruding from the spindle head end to threadedly receive said adjusting nut, a sleeve assembly slidable onto the end portion of the spindle head over said nut, said sleeve assembly comprising an axially shiftable carrying bushing having aperture means for receiving a plurality of locking balls annularly disposed around said bushing, the portion of said bushing adjacent said balls having a radial thickness smaller than the ball diameters, a locking bushing having an end portion surrounding said nut and a sleeve portion generally surrounding the portion of said carrying bushing including said balls, said sleeve portion having means defining an inwardly facing conical surface with the larger diameter thereof being toward said nut, and spring means extending between said locking and carrying bushings for urging said carrying bushing away from said nut.

The assembly further includes connection between the locking bushing and the nut for limiting relative movement therebetween, the connection means including a blind hole extending radially into the nut and a set screw penetrating the locking bushing and extending into the blind hole.

In order that the manner in which the foregoing and other objects are attached in accordance with the invention can be understood in detail, a particularly advantageous embodiment thereof will be described with reference to the accompanying drawing, which forms a part of this specification, and which shows a plan view, in partial section, of a spindle head together with an assembly in accordance with the invention.

As will be seen in the FIGURE, the spindle head 1 is a generally cylindrical body having a bore extending into the body from one end, the bore also being generally cylindrical and having an elongated groove or slot 4 parallel with the axis of the head. A plug in the form of an adjusting adapter 2 extends into the bore, the adapter being adapted to receive a tool, not shown. The adapter carries a plate-like key 3 which engages the groove 4 in the spindle head. One end of the adapter protrudes beyond the bore and is externally threaded to receive an internally threaded adjusting nut 5 which has a diameter sufficiently large to abut the end face of the spindle head. The adjusting nut is provived with a plurality of blind holes 15 which extend radially inwardly from the outer surface of the nut and which are distributed at equal angles about the periphery of the nut. Four such holes are shown, spaced at 90° intervals.

The adjusting nut 5 and the lower part of the spindle head 1 are surrounded and enclosed by a locking bushing 6 which is a generally tubular body having an annular collar or flange 7 extending radially inwardly from one end thereof, the flange defining an opening having a diameter larger than the protruding end of the adjusting adapter and smaller than the outer diameter of nut 5 so that the collar abuts the outer face of the nut. A set screw 8 extends through a threaded opening in the locking bushing and penetrates into one of the blind holes 15 in nut 5.

At the opposite end of locking bushing 6 from collar 7, a carrying or supporting bushing 9 surrounds head 1 and extends into bushing 6, the carrying bushing being axially slidable relative to both the spindle head 1 and also locking bushing 6. Carrying bushing 9 is provided with an annular groove or a series of annular openings which carry a plurality of balls 10 which have a diameter greater than the wall thickness of that portion of bushing 9 carrying the balls. Thus, the balls can protrude inwardly beyond the inner surface of bushing 9 and can also protrude outwardly beyond the outer surface of that bushing. However, the openings or the groove are such that the balls are prevented from entirely passing inwardly through the carrying bushing when the assembly is removed from the spindle head. Thus, the balls cannot drop out. The locking bushing 6 is provided on its inner surface in the area of the balls with a radially outwardly extending recess 11 which has a cylindrical portion and a conical portion, the conical portion being disposed on that portion of the recess away from collar 7. The cylindrical part of recess 11 is developed in such a way that the balls 10 can engage with that part and no longer protrude beyond the inner surface of carrying bushing 9. The conical part of recess 11 is formed so that upon relative axial movement of bushing 9 away from bushing 6, the conical surface acts as a cam surface, pressing balls 10 inwardly toward the spindle head, thereby providing frictional engagement with the spindle head, this engagement being increased as the axial movement continues. This conical surface can be formed with a cone angle of, for example, 20°.

A peg 12 is inserted through an opening in locking bushing 6 with a press fit, the peg engaging an elongated hole 13 in carrying bushing 9, hole 13 being elongated such that it has a dimension parallel with the axis of the spindle head significantly greater than the diameter of peg 12. As a result of this relationship, relative rotation between locking bushing 6 and carrying bushing 9 can be prevented. Also, peg 12 can prevent a complete separation of the carrying bushing 9 from locking bushing 6 when the balls are protruding to their maximum extent from the inner surface of the carrying bushing. A helical compression spring 14 extends between that end of carrying bushing 9 facing toward collar 7 and an annular shoulder formed on the interior of bushing 6. Compression spring 14 tends to urge the two bushings axially away from each other.

The drawing shows the sleeve-plug assembly plugged into the spindle head with the position of the assembly being maintained by the force of the spring and the cam surface urging the balls inwardly toward the spindle head. Thus, the assembly is locked in position. When the sleeve-plug assembly is to be removed from the spindle head, an axial force in a direction toward adjusting nut 5 is applied to the carrying bushing 9, thereby compressing spring 14. Relatively small axial movement of bushing 9 further into the sleeve portion of bushing 6 permits the balls to move radially into the cylindrical portion of recess 11, thereby decreasing the engagement force between the balls and the outer surface of the spindle head, and the entire assembly, including the adjusting nut and adapter 2, can simply be pulled off the spindle head. Because of the connection of the adjusting nut with the locking bushing by way of set screw 8, the assembly is removed as a unit.

To install the apparatus on the spindle head, the sleeve-plug assembly is simply pushed onto the spindle head in the direction of insertion of adapter 2, the frictional engagement between the balls and the exterior of the spindle head causing a compression of helical spring 14 and axial movement of bushing 9 until the assembly is completely inserted, i.e., until adjusting nut 5 abuts the open end of the spindle head. At this point, the spring inhibits any effort to slide the assembly off the spindle head until there is again axial force applied to the carrying bushing sufficient to compress the spring and remove the retaining ball force from the spindle head surface.

The assembly thus described may be attached in the case of a quick change chuck, the adjusting nut of which and the adjusting adapter of which may be connected with one another by means of balls which serve for the release and for the connection of the adjusting adapter with the spindle head. A connecting casing cooperating with the balls has been pushed for this purpose onto the adjusting adaptor. It is also possible to provide the helical spring between the projecting annular collar of the carrying bushing and the distal end of the locking bushing rather than within the locking bushing as shown in the drawing. A sleeve-plug assembly may also be called a slip-on quick change chuck.

While one advantageous embodiment has been chosen to illustrate the invention, it will be understood by those skilled in the art that various changes and modifications can be made therein without departing from the scope of the invention as defined in the appended claims.

What is claimed is:

1. A sleeve-plug assembly attachable to a spindle head of the type having a generally cylindrical body and a bore extending axially into one end thereof, the assembly including the combination of
   an adjusting nut;
   an adjustable adapter insertable into said bore, said adapter having a threaded end protruding from the spindle head to threadedly receive said adjusting nut;
   a sleeve assembly slidable onto the end portion of the spindle head over said nut, said sleeve assembly comprising
      an axially shiftable carrying bushing having aperture means for receiving a plurality of locking balls annularly disposed around said bushing, the portion of said bushing adjacent said balls having a radial thickness smaller than the ball diameters,
      a locking bushing having an end portion surrounding said nut and a sleeve portion generally surrounding the portion of said carrying bushing including said balls, said sleeve portion having means defining an inwardly facing conical surface with the larger diameter thereof being toward said nut, and
      spring means extending between said locking and carrying bushings for urging said carrying bushing away from said nut.

2. An assembly according to claim 1 wherein one of said bushings carries a radially extending peg and the other of said bushings includes means defining an opening to receive said peg, said opening having a dimension parallel to the central axis of said bushings which is significantly greater than the diameter of said peg.

3. An apparatus according to claim 1 wherein said end portion of said locking bushing includes a radially inwardly extending flange for contacting a face of said adjustment nut.

4. An apparatus according to claim 1 wherein said locking bushing includes an annular shoulder facing said carrying bushing, and said spring means extends between said shoulder and said carrying bushing within said sleeve portion.

5. An apparatus according to claim 4 and further comprising connection means between said locking bushing and said nut for limiting relative movement therebetween.

6. An apparatus according to claim 5 wherein said connection means includes
   a blind hole extending radially into said nut and
   a set screw penetrating said locking bushing and extending into said blind hole.

* * * * *